May 13, 1924.

A. HEGGELUND

RELEASING DEVICE

Filed April 18, 1922

1,494,240

AXEL HEGGELUND
INVENTOR

BY Victor J. Evans
ATTORNEY

Patented May 13, 1924.

1,494,240

UNITED STATES PATENT OFFICE.

AXEL HEGGELUND, OF THOR, IOWA.

RELEASING DEVICE.

Application filed April 18, 1922. Serial No. 554,826.

*To all whom it may concern:*

Be it known that I, AXEL HEGGELUND, a citizen of the United States, residing at Thor, in the county of Humboldt and State of Iowa, have invented new and useful Improvements in Releasing Devices, of which the following is a specification.

This invention relates to releasing mechanism for animals and has for its primary object the construction and arrangement of parts whereby any number of animals may be released by a single operation of suitable mechanism.

An object of the invention is the novel manner of constructing the various parts so that one continuous cable may be utilized for operating the devices irrespective of their various positions.

Besides the above my invention is distinguished in the use of a drum having a connection with a single cable that is in turn connected to a plurality of releasing devices in a manner that the latter may be moved to holding or releasing position.

With these and other objects in view the invention will be better understood from the following detailed description taken in connection with the accompanying drawing.

Figure 1:
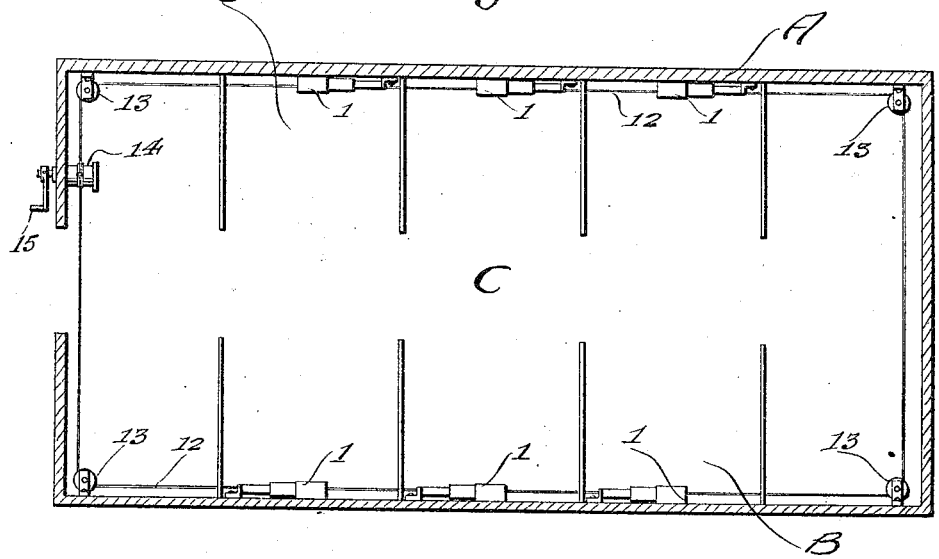
Fig. 1 is a diagrammatic view illustrating an application of my invention.
Figure 2:
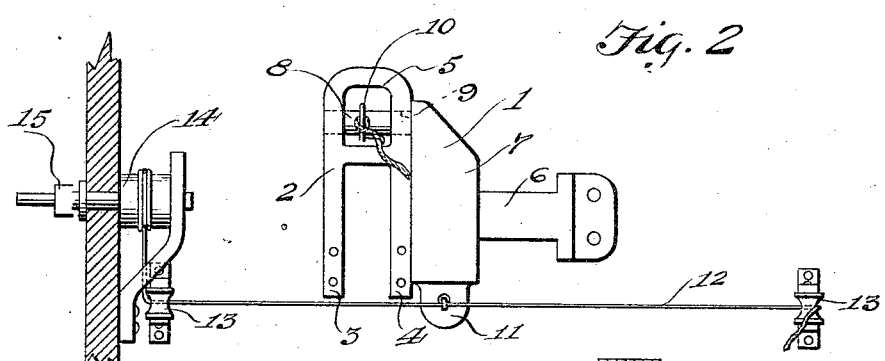
Fig. 2 is an enlarged side elevation of one of the releasing devices.
Figure 3:
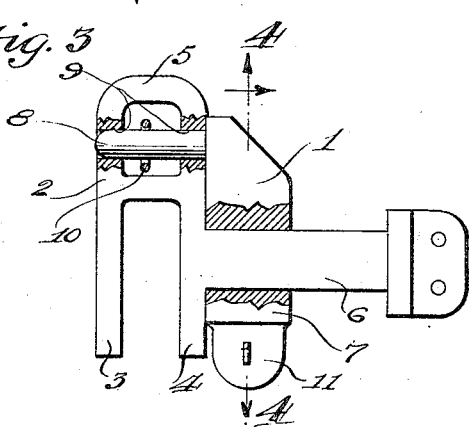
Figs. 3 and 4 are sectional views.
Figure 4:
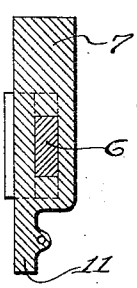

Referring to the drawing illustrating one of the many constructions of my invention the letter A designates in a diagrammatic manner a stable or other house divided into stalls B communicating with the runway C. Arranged in each stall is a release device 1. Each releasing device consists of a bracket 2 constructed to have a pair of spaced arms 3 and 4 and an eye portion 5. Projecting from the arm 4 is a guide 6 upon which is slidably mounted the slide 7. This slide 7 has projecting therefrom a pin 8 mounted in the hole 9 in the bracket and adapted to extend across the eye portion 5 for holding against dislocation the ring 10 of the halter of the animal. Each slide is provided with an ear 11 and all of the ears of the various devices are connected together by the cable 12 which extends around the guide pulleys 13. This cable has a portion of its length wrapped around a drum 14 so that in the operation of the drum 14 by the crank 15 the cable is actuated for retracting the pin 8 from the eye portion and thereby releasing the ring 10. By reversing the direction of travel of the drum the pin can be mechanically forced across the eye portion for locking the ring in place. Thus it will be seen that in a very simple, inexpensive manner I am capable of releasing any number of animals and besides the various devices may be simply operated towards locking position.

It is, of course, to be understood that the invention may be constructed in various other manners and the parts associated in different relations and, therefore, I do not desire to be limited in any manner except as set forth in the claim hereunto appended.

Having thus described my invention what I claim is:

A releasing device comprising a bracket having spaced arms, and an eye portion formed contiguous with the arms and lying in a parallel plane therewith, a guide arm extending at right angles to the spaced arms, a slide upon the guide, said bracket having openings upon opposite sides of the eye, a pin on the slide adapted to pass through the openings and bridge the eye, and perforated ear on the slide adjacent the guide arm for connection with an operating member.

In testimony whereof I affix my signature.

AXEL HEGGELUND.